United States Patent [19]

Winter et al.

[11] Patent Number: 5,304,614
[45] Date of Patent: Apr. 19, 1994

[54] PROCESS FOR THE PREPARATION OF AN OLEFIN POLYMER USING METALLOCENES HAVING SPECIFICALLY SUBSTITUTED INDENYL LIGANDS

[75] Inventors: Andreas Winter, Glashütten/Taunus; Martin Antberg, Hofheim am Taunus; Volker Dolle; Jürgen Rohrmann, both of Kelkheim; Walter Spaleck, Liederbach, all of Fed. Rep. of Germany

[73] Assignee: Hoechst Aktiengesellschaft, Frankfurt am Main, Fed. Rep. of Germany

[21] Appl. No.: 960,893

[22] Filed: Oct. 14, 1992

[30] Foreign Application Priority Data

Oct. 15, 1991 [DE] Fed. Rep. of Germany ....... 4134088

[51] Int. Cl.$^5$ ................................................ C08F 4/42
[52] U.S. Cl. .................................... 526/127; 526/160; 526/351; 502/155
[58] Field of Search .............................. 526/127, 160

[56] References Cited

U.S. PATENT DOCUMENTS 5,017,714  5/1991  Welborn, Jr. ................... 526/160
5,132,262  7/1992  Rieger et al. ................... 526/160

FOREIGN PATENT DOCUMENTS 0363029  11/1990  European Pat. Off. .
3826075   2/1990  Fed. Rep. of Germany .
4035886   5/1992  Fed. Rep. of Germany .

OTHER PUBLICATIONS

Kaminsky, W. et al., *Angew. Chem. Int. Ed. Engl.* 24, 507–508 (1985).

*Primary Examiner*—Joseph L. Schofer
*Assistant Examiner*—David Wu
*Attorney, Agent, or Firm*—Connolly & Hutz

[57] ABSTRACT

A very active catalyst system for olefin polymerization comprises a cocatalyst, preferably an aluminoxane, and a metallocene of the formula I or Ia

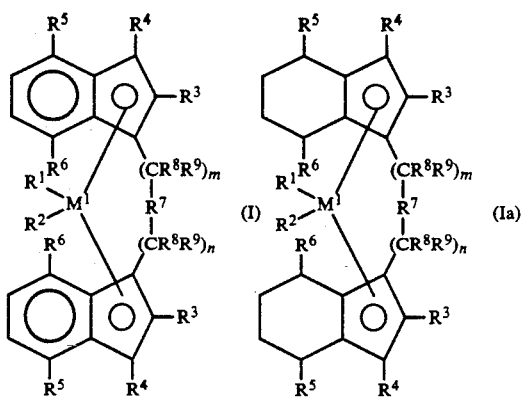

in which, preferably, $M^1$ is Zr or Hf, $R^1$ and $R^2$ are alkyl or halogen, $R^3$ and $R^4$ are hydrogen or alkyl, $R^5$ and $R^6$ are alkyl, $-(CR^8R^9)_m-R^7-(CR^8R^9)_n$ is a chain with one or more members, in which $R^7$ can also be a (substituted) heteroatom, and m+n is zero or 1.

8 Claims, No Drawings

PROCESS FOR THE PREPARATION OF AN OLEFIN POLYMER USING METALLOCENES HAVING SPECIFICALLY SUBSTITUTED INDENYL LIGANDS

Process for the preparation of an olefin polymer using metallocenes having specifically substituted indenyl ligands.

The invention relates to a process for the preparation of olefin polymers and copolymers using metallocenes having specifically substituted indenyl ligands.

The use of chiral metallocenes as catalyst components in olefin polymerization is known and leads to highly isotactic polyolefins of high crystallinity and high melting points (cf. Angew. Chem. 97(1985) 507 and DE-P 40 35 886.0).

The use of non-chiral metallocenes hives atactic polymers which are of only limited industrial importance because of their unbalanced and inadequate product properties.

Products which have a profile of properties which lies between these two extremes are of great interest.

There was thus the object of discovering a suitable process and a suitable catalyst system which allows the preparation of polymers of reduced crystallinity, increased impact strength, increased transparency, high flowability at the processing temperature, low molecular weight and reduced melting point.

The main applications of such polymers are plasticizer and lubricant recipes, hot melt adhesive, coatings, sealings, insulations, plugging compositions or sound-proofing materials.

The invention thus relates to a process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms joining them, can form a ring, at a temperature of $-60°$ to $200°$ C., under a pressure of 0.5 to 100 bar, in solution, in suspension or in the gas phase, in the presence of a catalyst which is formed from a metallocene as the transition metal compound and a cocatalyst, wherein the metallocene is a compound of the formula I or Ia

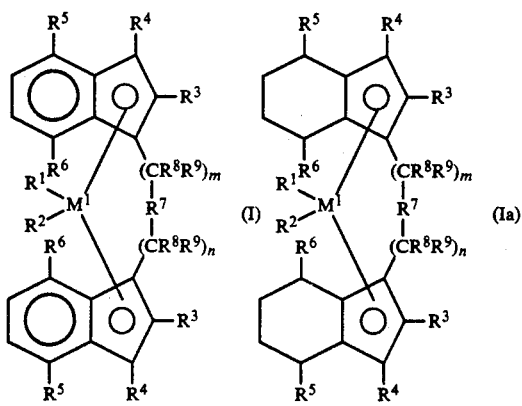

in which
M$^1$ is a metal of group IVb, Vb or VIb of the periodic table,
R$^1$ and R$^2$ are identical or different and are a hydrogen atom, a C$_1$-C$_{10}$-alkyl group, a C$_1$-C$_{10}$-alkoxy group, a C$_6$-C$_{10}$-aryl group, a C$_6$-C$_{10}$-aryloxy group, a C$_2$-C$_{10}$-alkenyl group, a C$_7$-C$_{40}$-arylalkyl group, a C$_7$-C$_{40}$-alkylaryl group, a C$_8$-C$_{40}$-arylalkenyl group or a halogen atom, R$^3$ and R$^4$ are identical or different and are a hydrogen atom, a halogen atom, a C$_1$-C$_{10}$-alkyl group, which can be halogenated, a C$_6$-C$_{10}$-aryl group or an —NR$_2^{10}$, —SR$^{10}$, —OSiR$_3^{10}$, —SiR$_3^{10}$ or —PR$_2^{10}$ radical, in which R$^{10}$ is a halogen atom, a C$_1$-C$_{10}$-alkyl group or a C$_6$-C$_{10}$-aryl group, R$^5$ and R$^6$ are identical or different and have the meaning given for R$^3$ and R$^4$, with the proviso that R$^5$ and R$^6$ are not hydrogen, R$^7$ is

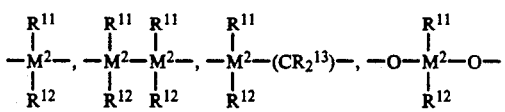

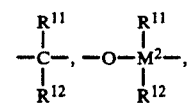

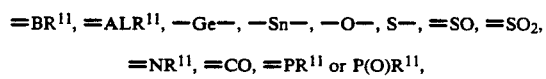

$=NR^{11}$, $=CO$, $=PR^{11}$ or $P(O)R^{11}$, in which
R$^{11}$, R$^{12}$ and R$^{13}$ are identical or different and are a hydrogen atom, a halogen atom, a C$_1$-C$_{10}$-alkyl group, a C$_1$-C$_{10}$-fluoroalkyl group, a C$_6$-C$_{10}$-aryl group, a C$_6$-C$_{10}$-fluoroaryl group, a C$_1$-C$_{10}$-alkoxy group, a C$_2$-C$_{10}$-alkenyl group, a C$_7$-C$_{40}$-arylalkyl group, a C$_8$-C$_{40}$-arylalkenyl group, or a C$_7$-C$_{40}$-alkylaryl group, or R$^{11}$ and R$^{12}$ or R$^{11}$ and R$^{13}$, in each case with the atoms joining them, form a ring, and
M$^2$ is silicon, germanium or tin,
R$^8$ and R$^9$ are identical or different and have the meaning given for R$^{11}$ and
m and n are identical or different and are zero, 1 or 2, m plus n being zero, 1 or 2.

Alkyl is straight-chain or branched alkyl. Halogen (halogenated) is fluorine, chlorine, bromine or iodine, preferably fluorine or chlorine.

The catalyst to be used for the process according to the invention comprises a cocatalyst and a metallocene of the formula I or Ia.

In formula I or Ia, M$^1$ is a metal of group IVb, Vb or VIb of the periodic table, for example titanium, zirconium, hafnium, vanadium, niobium, tantalum, chromium, molybdenum or tungsten, preferably zirconium, hafnium and titanium.

R$^1$ and R$^2$ are identical or different and are a hydrogen atom, a C$_1$-C$_1$-, preferably C$_1$-C$_3$-alkyl group, a C$_1$-C$_{10}$-, preferably C$_1$-C$_3$-alkoxy group, a C$_6$-C$_{10}$-, preferably C$_6$-C$_8$-aryl group, a C$_6$-C$_{10}$-, preferably C$_6$-C$_8$-aryloxy group, a C$_2$-C$_{10}$-, preferably C$_2$-C$_4$-alkenyl group, a C$_7$-C$_{40}$-, preferably C$_7$-C$_{10}$-arylalkyl group, a C$_7$-C$_{40}$-, preferably C$_7$-C$_{12}$-alkylaryl group, a C$_8$-C$_{40}$-, preferably C$_8$-C$_{12}$-arylalkenyl group or a halogen atom, preferably chlorine.

R$^3$ and R$^4$ are identical or different and are a hydrogen atom, a halogen atom, preferably a fluorine, chlorine or bromine atom, a C$_1$-C$_{10}$-, preferably C$_1$-C$_4$-alkyl group, which can be halogenated, A C$_6$-C$_{10}$-, preferably C₆-C₈-aryl group or an —NR₂¹⁰, —SR¹⁰, —OSiR₃¹⁰, —SiR₃¹⁰ or —PR₂¹⁰ radical, in which R¹⁰ is a halogen atom, preferably a chlorine atom, or a C₁-C₁₀-, preferably C₁-C₃-alkyl group or C₆-C₁₀-, preferably C₆-C₈-aryl group. R³ and R⁴ are particularly preferably hydrogen or methyl.

R⁵ and R⁶ are identical or different, preferably identical, and have the meaning given for R³ and R⁴, with the proviso that R⁵ and R⁶ cannot be hydrogen. R⁵ and R⁶ are preferably (C₁-C₄)-alkyl, which can be halogenated, such as methyl, ethyl, propyl, isopropyl, butyl, isobutyl or trifluoromethyl, in particular methyl.

R⁷ is

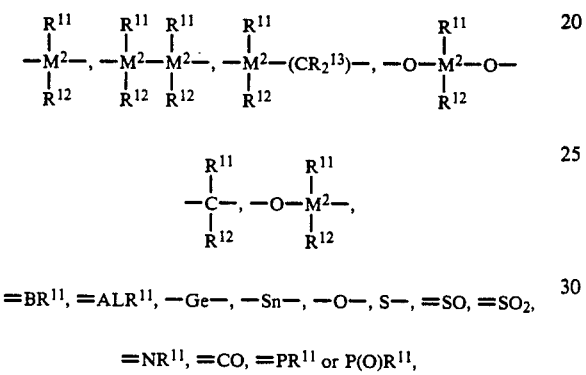

in which R¹¹, R¹² and R¹³ are identical or different and are a hydrogen atom, a halogen atom, a C₁-C₁₀-, preferably C₁-C₄-alkyl group, in particular a methyl group, a C₁-C₁₀-fluoroalkyl group, preferably a CF₃— group, a C₆-C₁₀-, preferably C₆-C₈-aryl group, a C₆-C₁₀-fluoroaryl group, preferably a pentafluorophenyl group, a C₁-C₁₀-, preferably C₁-C₄-alkoxy group, in particular a methoxy group, a C₂-C₁₀-, preferably C₂-C₄-alkenyl group, a C₇-C₄₀-, preferably C₇-C₁₀-arylalkyl group, a C₈-C₄₀-, preferably C₈-C₁₂-arylalkenyl group or a C₇-C₄₀-, preferably C₇-C₁₂-alkylaryl group, or R¹¹ and R¹² or R¹¹ and R¹³, in each case together with the atoms joining them, form a ring.

M² is silicon, germanium or tin, preferably silicon and germanium.

R⁷ is preferably =CR¹¹R¹², =SiR¹¹R¹², =GeR¹¹R¹², —O—, —S—, =SO, =PR¹¹ or =P(O)R¹¹.

R⁸ and R⁹ are identical or different and have the meaning given for R¹¹.

m and n are identical or different and are zero, 1 or 2, preferably zero or 1, m plus n being zero, 1 or 2, preferably zero or 1.

The particularly preferred metallocenes are thus the compounds of the formulae A and B and hydrogenated forms thereof in the sense of formula Ia

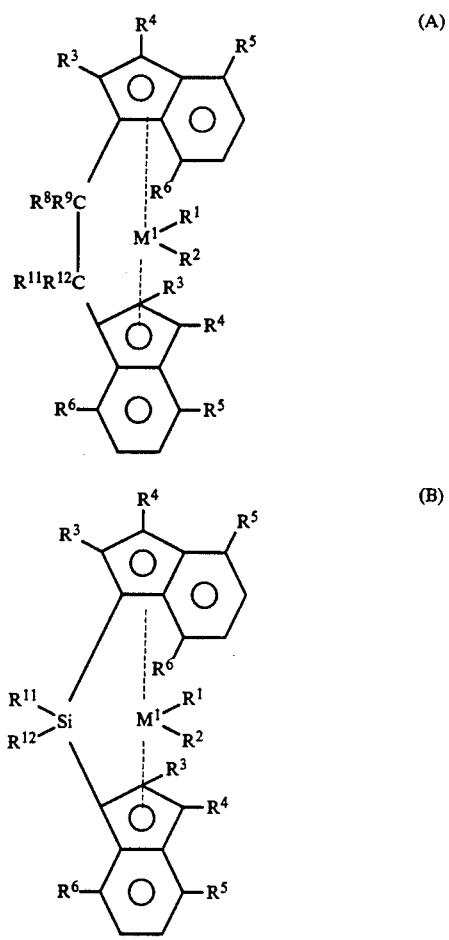

where
M¹ = Zr or Hf; R¹ and R² = (C₁-C₃)-alkyl or chlorine; R³ and R⁴ = hydrogen or (C₁-C₄)-alkyl; R⁵ and R⁶ = (C₁-C₄)-alkyl, which can be halogenated, and R⁸, R⁹, R¹¹ and R¹² have the above mentioned meanings, in particular the compounds I and Ia described in the embodiment examples.

The chiral metallocenes are preferably employed as a racemate. However, the pure R- or S-form can also be used. An optically active polymer can be prepared using these pure stereoisomeric forms. However, the meso-form of the metallocenes should be removed, since the polymerization-active center (the metal atom) in these compounds is no longer chiral because of mirror symmetry at the central metal and therefore cannot generate a highly isotactic polymer. If the meso-form is not removed, atactic polymer is also formed, in addition to isotactic polymer. For certain uses — flexible shaped articles, for example — this may be entirely desirable.

The separation of the stereoisomers is known in principle.

The metallocenes described above can be prepared in accordance with the following equation:

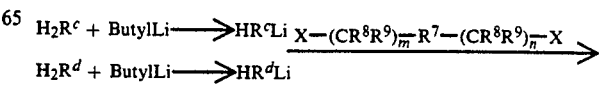

-continued

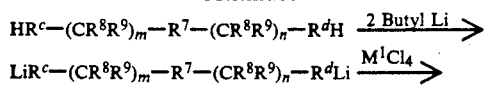

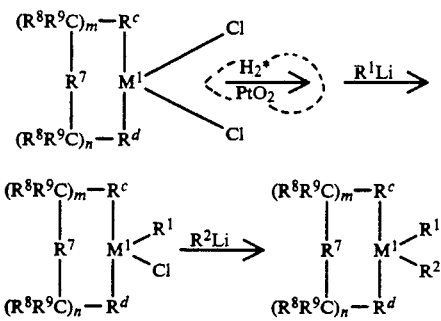

(*additional hydrogenation step for compounds of the formula Ia; cf. Embodiment Example V)

X = Cl, Br, I, O-Tosyl;

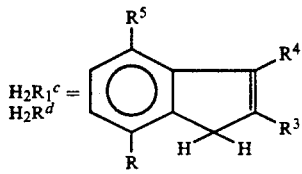

The preparation processes are known from the literature; cf. Journal of Organometallic Chem. 288(1985) 63-67, EP-A 320 762 and the embodiment examples.

The starting compounds $H_2R^c$ and $H_2R^d$ are prepared in accordance with Bull. Soc. Chim. Fr. 6 (1969) 1981 and the embodiment examples.

According to the invention, an aluminoxane of the formula (II)

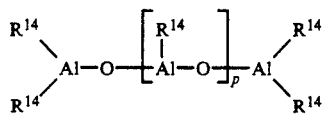
(II)

for the linear type, and/or of the formula (III)

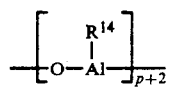
(III)

for the cyclic type, in which, in the formulae (II) and (III), the radicals $R^{14}$ can be identical or different and are a $C_1$-$C_6$-alkyl group, a $C_6$-$C_{18}$-aryl group, benzyl or hydrogen and p is an integer from 2 to 50, preferably 10 to 35, is preferably used as the cocatalyst.

Preferably, the radicals $R^{14}$ are identical and are methyl, isobutyl, phenyl or benzyl, particularly preferably methyl.

If the radicals $R^{14}$ are different, they are preferably methyl and hydrogen, or alternatively methyl and iosbutyl, the compounds preferably containing hydrogen or, respectively, isobutyl to the extent of 0.01–40% (number of radicals $R^{14}$).

The aluminoxane can be prepared in various ways by known processes. One of the methods is, for example, to react an aluminum-hydrocarbon compound and/or a hybridoaluminum-hydrocarbon compound with water (gaseous, solid, liquid or bonded — for example as water of crystallization) in an inert solvent (such as, for example, toluene). To prepare an aluminoxane having different alkyl groups $R^{14}$, two different aluminum trialkyls ($AlR_3+AlR'_3$) corresponding to the desired composition are reacted with water (cf. S. Pasynkiewicz, Polyhedron 9 (1990) 429 and EP-A 302 424).

The precise structure of the aluminoxanes II and III is not known.

Regardless of the type of preparation, all aluminoxane solutions have the common features of a varying content of unreacted aluminum starting compound, which is present in the free form or as an adduct.

It is possible to preactivate the metallocene with an aluminoxane of the formula (II) and/or (III) before use in the polymerization reaction. By this procedure, the polymerization activity is significantly increased and the grain morphology is improved.

The preactivation of the transition metal compound is carried out in solution. Preferably, for this, the metallocene is dissolved in a solution of the aluminoxane in an inert hydrocarbon. An aliphatic or aromatic hydrocarbon is a suitable inert hydrocarbon. Toluene is preferably used.

The concentration of the aluminoxane in the solution is in the range from about 1% by weight up to the saturation limit, preferably from 5 to 30% by weight, in each case based on the total solution. The metallocene can be employed in the same concentration, but is preferably employed in an amount of $10^{-4}$—1 mol per mole of aluminoxane. The preactivation time is 5 minutes to 60 hours, preferably 5 to 60 minutes. The preactivation is carried out at a temperature of $-78°$ C. to 100° C., preferably 0° to 70° C.

The metallocene can also be prepolymerized or applied to a support. The (or one of the) olefin(s) employed in the polymerization is(are) preferably used for the prepolymerization.

Suitable supports are, for example, silica gels, aluminum oxides, solid aluminoxane or other inorganic support materials. A polyolefin powder in finely divided form is also a suitable support material.

According to the invention, compounds of the formulae $R_xNH_{4-x}BR'_4$, $R_xPH_{4-x}BR'_4$, $R_3CBR'_4$ or $BR'_3$ can be used as suitable cocatalysts instead of or as well as an aluminoxane. In these formulae, x is a number from 1 to 4, preferably 3, the radicals R are identical or different, preferably identical, and are $C_1$-$C_{10}$-alkyl or $C_6$-$C_{18}$-aryl, or 2 radicals R, together with the atom joining them, form a ring, and the radicals R' are identical or different, preferably identical, and are $C_6$-$C_{18}$-aryl, which can be substituted by alkyl, haloalkyl or fluorine.

In particular, R is ethyl, propyl, butyl or phenyl and R' is phenyl, pentafluorophenyl, 3,5-bistrifluoromethylphenyl, mesityl, xylyl or tolyl (cf. EP-A 277 003, EP-A 277 004 and EP-A 426 638).

If the above mentioned cocatalysts are used, the actual (active) polymerization catalyst comprises the reaction product of the metallocene and one of the compounds mentioned. This reaction product is therefore preferably prepared outside the polymerization reactor in a separate step using a suitable solvent.

In principle, any compound which, on the basis of its Lewis acidity, can convert the neutral metallocene into a cation and stabilize this ("labile coordination") is suitable according to the invention as the cocatalyst.

Moreover, the cocatalyst or the anion formed from it should not undergo further reactions with the metallocene cation formed (cf. EP-A 427 697).

To remove catalyst poisons present in the olefin, purification with an aluminum alkyl, for example AlMe$_3$ or AlEt$_3$, is advantageous. This purification either can be carried out in the polymerization system itself, or the olefin is brought into contact with the Al compound before addition into the polymerization system, and is then separated off again.

The polymerization or copolymerization is carried out in a known manner in solution, in suspension or in the gas phase, continuously or discontinuously, in one or more stages, at a temperature of $-60°$ to $200°$ C., preferably $30°$ to $80°$ C. Olefins of the formula $R^a$—CH=CH—$R^b$ are polymerized or copolymerized. In this formula, $R^a$ and $R^b$ are identical or different and are a hydrogen atom or an alkyl radical having 1 to 14 carbon atoms. However, $R^a$ and $R^b$ can also form a ring with the C atoms joining them. Examples of such olefins are ethylene, propylene, 1-butene, 1-hexene, 4-methyl-1-pentene, 1-octene, norbornene or norbonadiene. In particular, propylene and ethylene are polymerized.

Hydrogen is added, if necessary, as a molecular weight regulator and/or to increase the activity. The overall pressure in the polymerization system is 0.5 to 100 bar. Polymerization in the pressure range of 5 to 64 bar, which is of particular interest industrially, is preferred.

In this procedure, the metallocene is used in a concentration, based on the transition metal, of $10^{-3}$ to $10^{-8}$, preferably $10^{-4}$ to $10^{-7}$, mol of transition metal per dm$^3$ of solvent or per dm$^3$ of reactor volume. The aluminoxane is used in a concentration of $10^{-5}$ to $10^{-1}$ mol, preferably $10^{-4}$ to $10^{-2}$ mol, per dm$^3$ of solvent or per dm$^3$ of reactor volume. The other cocatalysts mentioned are used in amounts which are approximately equimolar to that of the metallocene. In principle, however, higher concentrations are also possible.

If the polymerization is carried out as suspension or solution polymerization, an inert solvent customary for the Ziegler low pressure process is used. For example, the polymerization is carried out in an aliphatic or cycloaliphatic hydrocarbon; examples of such which may be mentioned are propane, butane, pentane, hexane, heptane, isooctane, cyclohexane and methylcyclohexane.

Furthermore, a gasoline or hydrogenated diesel oil fraction can be used. Toluene can also be used. The polymerization is preferably carried out in the liquid monomer.

If inert solvents are used, the monomers are metered into the reaction in gaseous or liquid form.

The polymerization can be of any duration, since the catalyst system to be used according to the invention exhibits only a slight decrease in polymerization activity with respect to time.

The process according to the invention is distinguished by the fact that the metallocenes described preferentially produce, in the temperature range of industrial interest of between $30°$ and $80°$ C. and at a high polymerization activity, polymers having the desired spectrum of properties.

Moreover, it has been found, surprisingly, that olefins such as propylene or higher molecular weight homologs can be polymerized using the metallocenes I and Ia to give polymers of low molecular weight, but the behavior of these metallocenes toward ethylene is completely different— very high molecular weight polyethylenes are formed with an excellent activity.

The following examples are intended to illustrate the invention in more detail.

in the examples

| | |
|---|---|
| VN = | viscosity number in cm$^3$/g |
| M$_2$ = | weight-average molecular weight in g/mol } determined by gel permeation chromatography |
| M$_w$/M$_n$ = | molecular weight dispersity |
| m.p. = | melting point determined by differential scanning calorimetry (20° C./minute heating up/cooling down rate) |
| II = | isotactic index (II = mm + ½ mr), determined by $^{13}$C-NMR spectroscopy |
| BD = | polymer bulk density in g/dm$^3$ |

SYNTHESIS OF THE METALLOCENES USED IN THE EXAMPLES

I.

rac-[Dimethylsilylbis{1-(4,7-dimethylindenyl)}]-zirconium dichloride 1. 4,7-Dimethylindene 23 g (1.0 mol) of sodium were dissolved in portions in 250 ml of absolute methanol. A mixture of 45.6 g (0.40 mol) of 2,5-hexanedione and 39.7 g (0.60 mol) of cyclopentadiene was then added dropwise at 0° C. in the course of 1 hour. After the mixture had been stirred at room temperature for 1 hours, 50 ml of water were added and the mixture was extracted with about 2 l of diethylether. The residue which remained after the solvent had been stripped off was chromatographed on 1.4 kg of silica gel 60. 38 g (65%) of 4,6-dimethylindene (yellowish oil) were eluted with hexane/methylene chloride (10:1).

2. bis{1-(4,7-Dimethylindenyl)}-Dimethylsilane 7.0 g (48.5 mmol) of 4,7-dimethylindene were dissolved in 60 ml of diethyl ether, and 19.4 ml (48.5 mmol) of a 2.5 M solution of butyllithium in hexane were added under an Ar atmosphere. After a short time, a white precipitate separated out and was dissolved again by addition of 4 ml of tetrahydrofuran. After the solution had been stirred at room temperature for 2 hours, it was slowly added dropwise to a solution of 3.1 g (24.3 mmol) of dimethyldichlorosilane in 15 ml of diethyl ether. After the mixture had been stirred for 19 hours, it was poured onto ice-water and extracted several times with ether. The combined ether extracts were washed with water and dried over sodium sulfate. The yellow oil which remained after the solvent had been stripped off under reduced pressure was chromatographed on 350 g of silica gel 60. 3.1 g (37%) of the product (white powder, 2 isomers, melting point 67° C.) were eluted using a mobile phase mixture of hexane/methylene chloride (20:1).

3. rac-[Dimethylsilylbis{1-(4,7-dimethylindenyl)}]-zirconium dichloride 4.0 ml (10 mmol) of a 2.5 M solution of butyllithium in hexane were added to a solution of 1.5 g (4.86 mmol) of the ligand system in 15 ml of diethyl ether at room temperature, and the mixture was stirred for 5 hours, until the evolution of gas had ended. The yellow solution was evaporated and the residue was washed with hexane in order to remove excess butyllithium. After drying under an oilpump vacuum at 40°-50° C., the dilithium salt was added to a suspension of 1.08 g (4.3 mmol) of zirconium tetrachloride in 10 ml of methylene chloride at −78° C. After the mixture had been warmed up overnight, the orange-colored suspension was filtered over a G4 frit. The orange-colored filtrate was evaporated. 1.58 g (72%) of the complex were obtained as a mixture of the racemic form and the meso-form in a ratio of 5:1. The pure racemate was obtained in the form of large orange crystals by recrystallization from methylene chloride.

$^1$H-NMR of the racemate (CDCl$_3$): 7.07 (d,2,β-H), 6.75–7.05 (m,4,aromatic-H), 6.17 (d,2,α-H), 2.53 (s,6,CH$_3$), 2.38 (s,6,CH$_3$), 1.14 (s,6,Si(CH$_3$)$_2$).

II.
rac-[1,2-Ethanediylbis{1-(2-methyl-4,7-dimethylindenyl)}]zirconium dichloride 1. 4,7-Dimethyl-2-indanone 8.2 g (57 mmol) of 4,7-dimethylindene (for the preparation, see Example I) were added dropwise to a mixture of 34 ml of formic acid and 8 ml (80 mmol) of H$_2$O$_2$ (35% strength) at 35°–40° C. in the course of 80 minutes, while stirring vigorously (exothermic reaction). After the mixture had been stirred overnight, the formic acid was stripped off under reduced pressure (40° C./20 mm Hg). 200 ml of 7% strength sulfuric acid were added to the orange-colored oil which remained, and the mixture was distilled. The product was distilled over with a total of 800 ml of water, the water constantly being topped up. The product partly precipitated as a solid in the condenser and was transferred to the receiver by brief heating. The aqueous distillate was neutralized with a saturated sodium carbonate solution and extracted with ether. The organic phase was dried over sodium sulfate and concentrated, whereupon the product crystallized. 5.6 g (62%) of the indanone were obtained in the form of colorless needles.

2. 2,4,7-Tirmethylindene 20 ml (60 mmol) of a 3M solution of methylmagnesium bromide in diethyl ether were slowly added to a solution of 5.5 g (34.3 mmol) of the indanone in 100 ml of diethyl ether such that the solvent boiled gently. After the mixture had been boiled under reflux for 1 hour, the white suspension was stirred overnight. The mixture was poured onto ice acidified with HCl, and extracted with diethyl ether. After the extract had been dried over sodium sulfate, the solvent was stripped off completely.

The solid was suspended in 170 ml of toluene, 0.65 g (3.14 mmol) of p-toluenesulfonic acid was added and the mixture was heated under reflux for 1.5 hours. After water had been added, the organic phase was isolated, dried over sodium sulfate and evaporated completely. The residue was chromatographed on 350 g of silica gel 60. 3.0 g (60%) of 2,4,7-trimethylindene (white solid) were eluted using hexane/methylene chloride 10:1.

3. 1,2-bis {1-(2,4,7-Trimethylindenyl)}ethane 4.2 ml (10.5 mmol) of a 2.5 M butyllithium solution in hexane were added to a solution of 1.7 g (10.5 mmol) of 2,4,7-trimethylindene in 50 ml of tetrahydrofuran at room temperature, and the mixture was stirred at 40° C. for 1 hour. 0.98 g (5.25 mmol) of dibromoethane was added at −78° C. The mixture was warmed to room temperature overnight, poured onto ice-water containing hydrochloric acid (pH 2) and extracted with diethyl ether. The ether phase was washed with NaHCO$_3$ solution and NaCl solution and dried over magnesium sulfate. When the ether extract was concentrated, 350 mg of the product crystallized in the form of a colorless crystalline powder (2 isomers). 430 mg of unused 2,4,7-trimethylindene and a further 50 mg of the product were obtained by chromatography of the mother liquor on silica gel 60 using hexane/methylene chloride (10:1). The total yield was 22%.

4. rac-[1,2-Ethanediylbis{1-(2,4,7-trimethylindenyl)}]-zirconium dichloride 1.4 ml (3.5 mmol) of a 2.5 M butyllithium solution in hexane were added to a solution of 400 mg (1.16 mmol) of the chelating ligand in 60 ml of diethyl ether at room temperature, a red-orange coloration starting. After the mixture had been stirred at room temperature for 2–3 hours, 20 mol of hexane were added. The precipitate was isolated by decanting the supernatant solution, washed with hexane and dried under an oilpump vacuum for 3–4 hours. The dilithium salt was then added to a suspension of 240 mg (1.03 mmol) of zirconium tetrachloride in 15 ml of methylene chloride at −78° C. After the mixture had been warmed to room temperature, the orange suspension was filtered over a G4 frit and the solid was washed with methylene chloride. The filtrate was concentrated to dryness under an oilpump vacuum. 120 mg (24%) of the complex were obtained as an orange powder.

$^1$H-NMR of the racemate (CDCl$_3$): 6.8–7.1 (m,4,aromatic-H), 6.30 (s,2,β-H), 3.3–3.5 (m,4,C$_2$H$_4$), 2.60 (s,6,CH$_3$), 2.27 (s,6,CH$_3$), 1.57 (s,6, CH$_3$).

III.
rac-[Dimethylsilylbis{1-(3,4,7-trimethylindenyl)}]-zirconium dichloride 1. 3,4,7-Trimethylindene A mixture of 12 g (150 mmol) of methylcyclopentadiene and 17.1 g (150 mmol) of 2,5-hexanedione was added dropwise to a solution of 8.6 g (975 mmol) of sodium in 200 ml of methanol at 0° C. in the course of 1 hour. After stirring at room temperature for 18 hours, the dark red mixture was poured onto ice-water and extracted with ether. After the extract had been dried over sodium sulfate, the solvent was stripped off and the oil which remained was chromatographed on 600 g of silica gel 60. Using hexane as the mobile phase, first 3.2 g (13%) of 3,4,7-trimethylindene and then 1.5 g (6%) of 2,4,7-trimethylindene were eluted in close succession. Subsequent recrystallization from hexane gave the pure products.

2. bis{1-(3,4,7-Trimethylindenyl)}dimethylsilane 8.1 ml (20.2 mmol) of a 2.5 M butyllithium solution in hexane were added to a solution of 3.2 g (20.2 mmol) of 3,4,7-trimethylindene in 40 ml of tetrahydrofuran at 0° C., and the mixture was heated under reflux for a further hour and then added to a solution of 1.3 g (10.1 mmol) of dimethyldichlorosilane in 10 ml of tetrahydrofuran at room temperature. The red suspension was stirred at room temperature for 17 hours and was heated at the boiling point under reflux for a further 4 hours. The mixture was poured onto ice and extracted with ether. The ether extracts were combined, dried over sodium sulfate and evaporated to dryness. Recrystallization from hexane gave 1.4 g (37%) of the product in the form of beige-colored crystals (isomers).

3. rac-[Dimethylsilylbis{1-(3,4,7-dimethylindenyl)}]-zirconium dichloride 3.4 g (8.4 mmol) of a 2.5 M butyllithium solution in hexane were added to a solution of 1.4 g (3.8 mmol) of the ligand system in 25 ml of diethyl ether at 0° C. After the mixture had been stirred at room temperature for 2–3 hours, it was concentrated to 15 ml and the precipitate was filtered over a G4 frit. After being washed with hexane, it was dried under an oilpump vacuum. The pale beige dilithium salt was added to 800 mg (3.5 mmol) of zirconium tetrachloride in 20 ml of methylene chloride at −78° C. The mixture was warmed to room temperature in the course of 3-4 hours and filtered over a G4 frit. 20 ml of hexane were added to the filtrate and the mixture was concentrated to a volume of 10 ml. 500 mg of the complex (pure racemate) crystallized at −35° C.

$^1$H-NMR (CDCl$_3$): 6.6-6.9 (m,4,aromatic-H), 5.75 (s,2,α-H), 2.50 (s,6,CH$_3$), 2.45 (s,6,CH$_3$), 2.40 (s,6,CH$_3$), 1.07 (s,6,Si-CH$_3$).

IV.
rac-[1,2-Ethanediylbis{1-(4,7-dimethylindenyl)}]-zirconium dichloride 1. 1,2-(4,7-Dimethylindenyl)ethane 27 ml (43.2 mmol) of a 1.6 M solution of butyllithium in hexane were added dropwise to 6.19 g (42.9 mmol) of 4,7-dimethylindene in 150 ml of tetrahydrofuran under an Ar atmosphere, and the mixture was stirred at 60° C. for 1.5 hours. It was cooled to −78° C., 1.86 ml (21.5 mmol) of 1,2-dibromoethane were added and stirring was continued at room temperature for 2 hours. The reaction mixture was poured onto 2 N aqueous HCl and the organic phase was separated off, washed with saturated aqueous NaHCO$_3$ solution and NaCl solution in succession and dried (MgSO$_4$). The oil which remained after the solvent had been stripped off under reduced pressure was taken up in hexane and the precipitate formed was separated off. After drying under an oil-pump vacuum, 4.2 g (62%) of product were obtained.

2. rac-[1,2-Ethanediylbis{1-(4,7-dimethyl-indenyl)}]-zirconium dichloride 2.14 g (6.8 mmol) of the ligand system were dissolved in 80 ml of tetrahydrofuran, 8.7 ml (13.9 mmol) of a 1.6 M solution of butyllithium in hexane were added dropwise at room temperature in the course of 15 minutes, while stirring with a magnetic stirrer, and the mixture was stirred at 50° C. for 1 hour, until the evolution of gas had ended. The solvent was removed under an oilpump vacuum and the residue was washed with hexane in order to remove excess butyllithium. After drying under an oilpump vacuum, the dilithium salt, dissolved in 100 ml of tetrahydrofuran, and 2.65 g (7.1 mmol) of ZrCl$_4$.2THF, dissolved in 100 ml of tetrahydrofuran, were simultaneously added dropwise to 50 ml of tetrahydrofuran in the course of 1 hour. After the mixture had been stirred overnight, the solvent was removed under reduced pressure, the residue was taken up in toluene, the mixture was filtered and the solvent was removed. The residue was stirred with n-pentane for consolidation and crystallized from toluene at −35° C. 1.9 g (59%) of the complex were obtained as a mixture of the racemic form and the meso-form in a ratio of 3:1. The pure racemate was obtained by recrysallization from toluene/pentane.

$^1$H-NMR of the racemate (CDCl$_3$): 6.80 (d,2,β-H), 6.70-7.00 (m,4,aromatic-H), 6.30 (2,d,α-H), 3.50-4.30 (m,4,2CH$_2$), 2.73 (s,3,CH$_3$), 2.30 (s,3,CH$_3$).

V.
rac-[1,2-Ethanediylbis{1-(4,7-dimethyl-4,5,6,7-tetrahydroindenyl)}]zirconium dichloride 1.47 g (3.1 mmol) of CH$_2$CH$_2$ (4,7-Me$_2$-Ind)$_2$ZrCl$_2$ were dissolved in 70 ml of methylene chloride, 100 mg of PtO$_2$ were added and hydrogenation was carried out at room temperature under an increased pressure of 100 bar for 24 hours. After filtration, the solvent was removed in vacuo and the residue was recrystallized from hexane/toluene. 1.0 g (67%) of yellow crystals was obtained.

$^1$H-NMR of the racemate (CDCl$_3$): 6.60 (d,2, β-H), 5.85 (2,d,α-H), 2.30-3.30 (m,16, CH$_2$ and CH), 1.45 (d,3,CH$_3$), 1.35 (d,3,CH$_3$).

VI.
rac-[1,2-Butanediylbis{1-(4,7-dimethylindenyl)}]-zirconium dichloride 1. 1,2-bis(4,7-Dimethylindenyl)butane 52 ml (83.2 mmol) of a 1.6 M solution of butyllithium in hexane were added dropwise to 11.8 g (92 mmol) of 4,7-dimethylindene in 200 ml of tetrahydrofuran at room temperature under an Ar atmosphere, and the mixture was stirred at 60° C. for 1 hour. It was cooled to −78° C., 5 ml (40 mmol) of 1,2-dibromobutane were added, and stirring was continued overnight at room temperature. The reaction mixture was poured onto 2 N aqueous HCl and the organic phase was separated off, washed with saturated aqueous NaHCO$_3$ solution and NaCl solution in succession and dried (MgSO$_4$). The oil which remained after the solvent had been stripped off under reduced pressure was chromatographed on 350 g of silica gel (hexane). After drying under an oilpump vacuum, 1.4 g (10%) of product were obtained.

2. rac-[1,2-Butanediylbis{1-(4,7-dimethylindenyl)}]-zirconium dichloride 1.4 g (4 mmol) of the ligand system were dissolved in 50 ml of tetrahydrofuran, 5.1 ml (18.2 mmol) of a 1.6 M solution of butyllithium in hexane were added dropwise at room temperature in the course of 15 minutes while stirring with a magnetic stirrer, and the mixture was stirred at 60° C. for 1.5 hours until the evolution of gas had ended. The solvent was removed under an oilpump vacuum and the residue was washed with hexane in order to remove excess butyllithium. After drying under an oilpump vacuum, the dilithium salt was added in portions to 1.55 g (4.1 mmol) of ZrCl$_4$.2THF in 100 ml of tetrahydrofuran in the course of 50 minutes and stirring was continued for 3.5 hours. After the mixture had been filtered and the solvent had been removed, the residue was extracted with toluene/hexane, the extract was filtered and the solvent was removed. The residue was stirred with n-pentane for consolidation and crystallized from toluene at −35° C. 0.72 g (35%) of the complex was obtained as a mixture of the racemic form and the meso-form. The pure racemate was obtained by recrystallization from toluene/pentane.

$^1$H-NMR of the racemate (CDCl$_3$): 6.80 (d,2,β-H), 6.70-7.00 (m,4,aromatic-H), 6.25 (2,d,α-H), 3.50-4.30 (m,5,2CH$_2$ and CH), 2.70 (s,3,CH$_3$), 2.35 (s,3,CH$_3$), 1.1 (t,3,CH$_3$).

POLYMERIZATION EXAMPLES

Example 1

A dry 16 dm$^3$ reactor was flushed with nitrogen, and 10 dm$^3$ of liquid propylene were introduced. 30 cm$^3$ of a toluene solution of methylaluminoxane (corresponding to 40 mmol of al, average degree of oligomerization n=20) were then added and the batch was stirred at 30° C. for 15 minutes.

In parallel, 9.9 mg (0.02 mmol) of rac-dimethylsilyl (4,7-dimethyl-1-indenyl)$_2$zirconium dichloride were dissolved in 15 cm$^3$ of a toluene solution of methylaluminoxane (20 mmol of Al) and preactivated by being left to stand for 15 minutes. The solution was then introduced into the reactor, the mixture was heated up to 70° C. (10° C./minute) by supplying heat, and the polymerization system was kept at 70° C., by cooling, for 1 hour. The polymerization was stopped by gassing off the excess monomer. 1.39 kg of polypropylene were obtained. The activity of the metallocene was thus 140.4 kg of polypropylene/g of metallocene×hour.

$VN=20$ cm$^3$/g, $M_w=12,500$ g/mol, $M_w/M_n=2.1$, m.p.=128° C., BD=500 g/dm$^3$, II=90%.

Example 2

Example 1 was repeated at a polymerization temperature of 50° C. 0.65 kg of polypropylene, corresponding to 65.7 kg of polypropylene/g of metallocene×hour, was obtained.

$VN=30$ cm$^3$/g, $M_w=14,500$ g/mol, $M_w/M_n=2.1$, m.p.=134° C., BD=422 g/dm$^3$, II=95%.

Example 3

Example 1 was repeated with twice the amount of metallocene at a polymerization temperature of 30° C. 0.28 kg of polypropylene, corresponding to 14.9 kg of polypropylene/g of metallocene×hour, was obtained.

$VN=40$ cm$^3$/g, $M_w=16,000$ g/mol, $M_w/M_n=2.3$, m.p.=139° C.

Example 4

Example 1 was repeated, but before the addition of the liquid propylene, 5 Ndm$^3$ of hydrogen were introduced into the reactor, and the weight of the metallocene was 10.6 mg. 2.52 kg of polymer, corresponding to 237.7 kg of polypropylene/g of metallocene×hour, were obtained.

$VN=21$ cm$^3$/g, $M_w=13,100$ g/mol, $M_w/M_n=1.9$, m.p.=131° C.

Example 5

Example 1 was repeated, but 14.7 mg (0.031 mmol) of racethylene(4,7-dimethyl-1-indenyl)$_2$zirconium dichloride were added as the metallocene. 2.92 kg of polypropylene, corresponding to a metallocene activity of 198.6 kg of polypropylene/g of metallocene×hour, were obtained.

$VN=18$ cm$^3$/g, $M_w=8400$ g/mol, $M_w/M_n=2.1$, m.p.=124° C., BD=411 g/dm$^3$, II=90%.

Example 6

Example 5 was repeated at a polymerization temperature of 50° C. 1.38 kg of polymer, corresponding to 93.9 kg of polypropylene/g of metallocene×hour, were obtained.

$VN=17$ cm$^3$/g, $M_w=8100$ g/mol, $M_w/M_n=2.0$, m.p.=130° C., BD=453 g/dm$^3$.

Example 7

Example 5 was repeated at a polymerization temperature of 30° C. 0.37 kg of polymer, corresponding to 25.2 kg of polypropylene/g of metallocene×hour, was obtained.

$VN=40$ cm$^3$/g, $M_w=32,000$ g/mol, $M_w/M_n=2.7$, m.p.=150° C., BD=347 g/dm$^3$, II=94%.

Example 8

Example 1 was repeated, but 14.5 mg of rac-ethylene(4,7-dimethyl-4,5,6,7-tetrahydro-1-indenyl)-$_2$zirconium dichloride were used as the metallocene. 1.37 kg of polypropylene, corresponding to a metallocene activity of 94.5 kg of polypropylene/g of metallocene×hour, were obtained.

$VN=23$ cm$^3$/g, $M_w=12,300$ g/mol, $M_w/M_n=2.3$, m.p.=121° C., glass stage Tg at −25° C.

Example 9

Example 8 was repeated using 15.0 mg of the metallocene at a polymerization temperature of 50° C. 0.60 kg of polymer, corresponding to 40.0 kg of polypropylene/g of metallocene×hour, was obtained.

$VN=35$ cm$^3$/g, $M_w=24,500$ g/mol, $M_w/M_n=2.4$, m.p.=116° C., glass stage Tg at −22° C.

Example 10

Example 1 was repeated, but 15.0 mg of rac-ethylethylene-(4,7-dimethyl-1-indenyl)$_2$zirconium dichloride were used as the metallocene. 1.45 kg of polymer, corresponding to 96.7 kg of polypropylene/g of metallocene×hour, were obtained.

$VN=16$ cm$^3$/g, $M_w=7700$ g/mol, $M_w/M_n=1.8$, m.p.=129° C.

Example 11

Example 10 was repeated at a polymerization temperature of 50° C. 0.65 kg of polymer, corresponding to 43.3 kg of polypropylene/g of metallocene×hour, was obtained.

$VN=17$ cm$^3$/g, m.p.=134° C.

Example 12

Example 1 was repeated, but 15.2 mg of rac-ethylene-(2,4,7-trimethyl-1-indenyl)$_2$zirconium dichloride were employed as the metallocene. 1.49 kg of polymer, corresponding to 98.0 kg of polypropylene/g of metallocene×hour, were obtained.

$VN=44$ cm$^3$/g, $M_w=30,600$ g/mol, $M_w/M_n=2.3$, m.p.=145° C.

Example 13

Example 12 was repeated at a polymerization temperature of 50° C. 0.41 kg of polymer, corresponding to 27.0 kg of polypropylene/g of metallocene×hour, was obtained.

$VN=70$ cm$^3$/g, $M_w=61,100$ g/mol, $M_w/M_n=2.5$, m.p.=152° C.

Examples 14 to 18

0.75 dm$^3$ of a hydrocarbon cut (boiling point 100°–120° C.) was initially introduced into a dry 1.5 dm$^3$ reactor flushed with nitrogen, and 3.75 cm$^3$ of a toluene solution of methylaluminoxane (corresponding to 5 mmol of Al, average degree of oligomerization n=20) were added, while stirring.

0.125 mg of metallocene (Table 1) was dissolved in 1.25 cm$^3$ of a toluene solution of methylaluminoxane (1.66 mmol of Al) and was preactivated by being left to stand for 15 minutes. The reactor was heated up to 70° C., and 5 bar of ethylene were forced in, while stirring. The metallocene solution was added through a pressure block, the reactor pressure was kept constant at 5 bar by continuous addition of ethylene gas, and the temperature was kept constant at 70° C. by thermostatic control. After a polymerization time of one hour, while stirring, the reaction was stopped by addition of 5 ml of isopropanol, the reactor was emptied and the polymer was filtered off and dried in vacuo. For the results, see Table 1.

TABLE 1

| | | Ethylene polymerizations | | | |
|---|---|---|---|---|---|
| Example | Metallocene | Yield of PE (g) | VN (cm³/g) | $M_w$ (g/mol) | $M_w/M_n$ |
| 14 | Me₂Si(3,4,7-Me₃Ind)₂ZrCl₂ | 56 | 500 | 326,000 | 2.4 |
| 15 | Ethylethylene(4,7-Me₂Ind)₂ZrCl₂ | 39 | 599 | 470,000 | 2.5 |
| 16 | Ethylene(4,7-Me₂Ind)₂ZrCl₂ | 35 | 910 | 610,000 | 2.3 |
| 17 | Me₂Si(4,7-Me₂Ind)₂ZrCl₂ | 38 | 505 | 344,000 | 2.1 |
| 18 | Ethylene(2,4,7-Me₃Ind)₂ZrCl₂ | 35 | 480 | 310,000 | 2.3 |

In the table:
Me denotes methyl, Ind denotes indenyl, PE denotes polyethylene

Example 19

Example 1 was repeated, but 50 g of ethylene were metered in continuously during the polymerization. 1.44 kg of C₂/C₃ copolymer, corresponding to a metallocene activity of 145.5 kg of copolymer/g of metallocene×hour, were obtained.

VN=30 cm³/g, $M_w$=15,600 g/mol, $M_w/M_n$=2.2, m.p.=122° C. Ethylene content 3.1%, according to ¹³C-NMR, isolated incorporation of the ethylene units.

The melting point can be reduced by ethylene as a comonomer.

Example 20

Example 1 was repeated, but 16 Ndm³ of hydrogen were additionally metered into the reactor before addition of the propylene. 1.50 kg of polypropylene, corresponding to a metallocene activity of 151.5 kg of polymer/g of metallocene×hour, were obtained.

VN=15 cm³/g, $M_w$=9300 g/mol, $M_w/M_n$=2.0, m.p.=132° C., BD=520 g/dm³, II=92%.

We claim:

1. A process for the preparation of an olefin polymer by polymerization or copolymerization of an olefin of the formula $R^a$—CH=CH—$R^b$, in which $R^a$ and $R^b$ are identical or different having 1 to 14 carbon atoms, or $R^a$ and $R^b$, together with the atoms joining them, can form a ring, at a temperature of −60° to 200° C., under a pressure of 0.5 to 100 bar, in solution, in suspension or in the gas phase, in the presence of a catalyst which is formed from the components comprising a metallocene as the transition metal compound and a cocatalyst, wherein the metallocene is a compound of the formula I or Ia

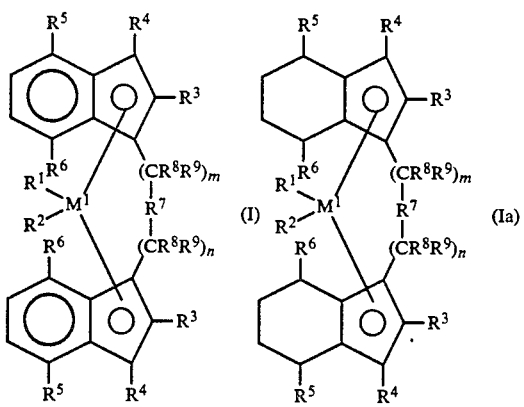

in which $M^1$ is a metal of group IVb, Vb or VIb of the periodic table, $R^1$ and $R^2$ are identical or different and are a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom, $R^3$ and $R^4$ are identical or different and are a hydrogen atom, a halogen atom, a $C_1$-$C_{10}$-alkyl group, which can be halogenated, a $C_6$-$C_{10}$-aryl group or an —NR₂¹⁰, —SR¹⁰, —OSiR₃¹⁰, —SiR₃¹⁰ or —PR₂¹⁰ radical, in which $R^{10}$ is a halogen atom, a $C_1$-$C_{10}$-alkyl group or a $C_6$-$C_{10}$-aryl group, $R^5$ and $R^6$ are identical or different and have the meaning given for $R^3$ and $R^4$, with the proviso that $R^5$ and $R^6$ are not hydrogen, $R^7$ is

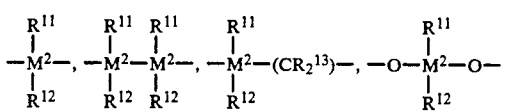

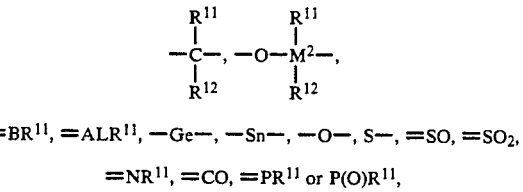

=BR¹¹, =AlR¹¹, —Ge—, —Sn—, —O—, S—, =SO, =SO₂,

=NR¹¹, =CO, =PR¹¹ or P(O)R¹¹, in which $R^{11}$, $R^{12}$ and $R^{13}$ are identical or different and are a hydrogen atom, a halogen atom a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ or $R^{11}$ and $R^{13}$, in each case with the atoms joining them, form a ring, and $M^2$ is silicon, germanium or tin, $R^8$ and $R^9$ are identical or different and have the meaning given for $R^{11}$ and m and n are identical or different and are zero, 1 or 2, m plus n being zero, 1 or 2.

2. A process as claimed in claim 1, wherein, in formula I or Ia, $M^1$ is Zr or Hf, $R^1$ and $R^2$ are identical or different and are ($C_1$-$C_3$)-alkyl or chlorine, $R^3$ and $R^4$ are identical or different and are hydrogen or ($C_1$-$C_4$)-alkyl, $R^5$ and $R^6$ are identical or different and are ($C_1$-$C_4$)-alkyl, which can be halogenated, $R^7$ is a radical

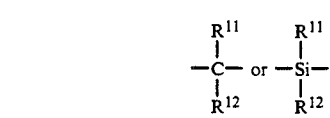

and m plus n is zero or 1.

3. The process as claimed in claim 1, wherein, in formula I or Ia, the substituents $R^5$ and $R^6$ are identical.

4. The process as claimed in claim 1, wherein rac-[dimethylsilylbis{1-(4,7-dimethylindenyl)}]-zirconium dichloride, rac-[1,2-ethanediylbis{1-(2-methyl-4,7-dimethylindenyl)}]zirconium dichloride, rac-[dimethylsilylbis{1-(3,4,7-trimethylindenyl)}]-zirconium dichloride, rac-[1,2-ethanediylbis{1-(4,7-dimethylindenyl)}]-zirconium dichloride, rac-(1,2-ethanediylbis{1-(4,7-dimethyl-4,5,6,7-tetrahydroindenyl)}]zirconium dichloride or rac-[1,2-butanediylbis{1-(4,7-dimethylindenyl)}]-zirconium dichloride is used as the metallocene of the formula I or Ia.

5. The process as claimed in claim 1, wherein an aluminoxane of the formula (II)

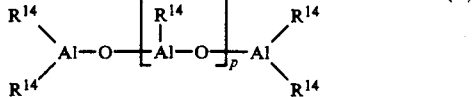

for the linear type, and/or of the formula (III)

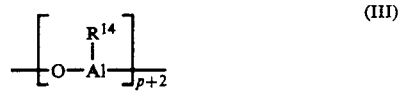

for the cyclic type, in which, in the formulae (II) and (III), the radicals $R^{14}$ are identical or different and are a $C_1$–$C_6$-alkyl group, a $C_6$–$C_{18}$-aryl group, benzyl or hydrogen and p is an integer from 2 to 50, is used as the cocatalyst.

6. The process as claimed in claim 1, wherein methylaluminoxane is used as the cocatalyst.

7. The process as claimed in claim 5, wherein the metallocene of the formula I or Ia is preactivated with an aluminoxane of the formula II and/or III before use in the polymerization reaction.

8. A method for polymerizing an olefin comprising the step of: polymerizing the olefin in the presence of the metallocene of formula I or Ia of claim 1 and a cocatalyst.

* * * * *

UNITED STATES PATENT AND TRADEMARK OFFICE
CERTIFICATE OF CORRECTION

PATENT NO. : 5,304,614
DATED : April 19, 1994
INVENTOR(S) : Andreas Winter et al It is certified that error appears in the above-indentified patent and that said Letters Patent is hereby corrected as shown below:

Column 1, line 18, delete "hives" and replace with -- gives --.

Column 2, line 57, delete "$C_1$-$C_1$-," and replace with -- $C_1$-$C_{10}$-, --.

Column 5, line 68, delete "hybridoaluminum" and replace with -- hydridoaluminum --.

Column 8, line 8, delete "$M_2$" and replace with -- $M_w$ --.

Column 12, line 62, delete "al," and replace with --Al, --.

Column 15, line 36, (Claim 1, line 4), between the words "different" and "having", insert the phrase -- and are a hydrogen atom or a hydrocarbon radical --.

Signed and Sealed this

Fourth Day of October, 1994

Attest:

BRUCE LEHMAN

Attesting Officer    Commissioner of Patents and Trademarks